United States Patent
Lovlekar et al.

(10) Patent No.: US 12,483,988 B2
(45) Date of Patent: Nov. 25, 2025

(54) RADIO OPERATIONAL CONFIGURATIONS

(71) Applicant: Apple Inc., Cupertino, CA (US)

(72) Inventors: Srirang A Lovlekar, Fremont, CA (US); Sethuraman Gurumoorthy, San Ramon, CA (US); B. Raju A. N. V., Bangalore (IN); Dimitrios Prodanos, San Francisco, CA (US); Utkarsh Kumar, San Jose, CA (US); Howard Tsai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 725 days.

(21) Appl. No.: 17/746,827

(22) Filed: May 17, 2022

(65) Prior Publication Data

US 2023/0088946 A1 Mar. 23, 2023

Related U.S. Application Data

(60) Provisional application No. 63/246,707, filed on Sep. 21, 2021.

(51) Int. Cl.
*H04W 52/02* (2009.01)
*H04W 4/90* (2018.01)
*H04W 60/00* (2009.01)

(52) U.S. Cl.
CPC ......... *H04W 52/0258* (2013.01); *H04W 4/90* (2018.02); *H04W 60/00* (2013.01)

(58) Field of Classification Search
CPC .... H04W 52/0258; H04W 4/90; H04W 60/00
See application file for complete search history.

(56) References Cited

U.S. PATENT DOCUMENTS

| | | | |
|---|---|---|---|
| 9,942,842 B1 * | 4/2018 | Humphries | H04J 3/1694 |
| 10,895,634 B2 | 1/2021 | Nath et al. | |
| 2003/0197615 A1 * | 10/2003 | Roche | G08B 25/14 340/531 |
| 2013/0217354 A1 * | 8/2013 | Robson | H04W 4/90 455/404.2 |
| 2017/0055197 A1 * | 2/2017 | Shukair | H04W 36/304 |
| 2017/0171814 A1 | 6/2017 | Belghoul et al. | |

(Continued)

FOREIGN PATENT DOCUMENTS

| | | |
|---|---|---|
| CN | 1894949 A | 1/2007 |
| CN | 101170775 A | 4/2008 |

(Continued)

OTHER PUBLICATIONS

U.S. Appl. No. 17/558,215, filed Dec. 21, 2021.

*Primary Examiner* — Myron Wyche
(74) *Attorney, Agent, or Firm* — Treyz Law Group, P.C.; Tianyi He

(57) ABSTRACT

An electronic device may include wireless circuitry having one or more radios and one or more antennas. For some device configurations such as during a device low-power mode, a radio (operating in a radio on-off mode) may alternate between on and off states based on a duty cycle to reduce power consumption and increase device battery life. Radio operation in the on-off mode and device operation in the low-power mode may accommodate other radio operations such as emergency broadcast message reception, radio operations under an allocated power budget, user equipment periodic registration and update operations.

18 Claims, 11 Drawing Sheets

(56) References Cited

U.S. PATENT DOCUMENTS

2018/0375902 A1* 12/2018 Wong ...................... H04W 8/08
2021/0360677 A1* 11/2021 Liberg .................. H04W 72/23
2022/0330153 A1* 10/2022 Hande ............... H04W 52/0251

FOREIGN PATENT DOCUMENTS

| CN | 101411233 A | 4/2009 | | |
|---|---|---|---|---|
| CN | 112369053 A | 2/2021 | | |
| JP | 2014109931 A | 6/2014 | | |
| JP | 2017103640 | * | 8/2017 | ............ H04M 1/725 |

* cited by examiner

RADIO OPERATIONAL CONFIGURATIONS

This application claims the benefit of U.S. provisional patent application No. 63/246,707, filed Sep. 21, 2021, which is hereby incorporated by reference herein in its entirety.

FIELD

This disclosure relates generally to electronic devices, including electronic devices with wireless circuitry.

BACKGROUND

Electronic devices are often provided with wireless capabilities. An electronic device with wireless capabilities has wireless circuitry that includes one or more antennas coupled to one or more radios.

If care is not taken, the wireless circuitry can consume excess power. It can also be challenging to control wireless circuitry power consumption while providing a user with some device functionalities.

SUMMARY

An electronic device may include wireless circuitry having one or more radios and one or more antennas. For some device configurations such as during a device low-power mode, a radio (operating in a radio on-off mode) may alternate between on and off states based on a duty cycle to reduce power consumption and increase device battery life.

In some illustrative configurations, the radio may detect an emergency broadcast and receive an emergency broadcast message during the radio-on states. If desired, the radio may extend operation in the radio-on state (beyond the regular duty cycle) to receive one or more emergency broadcast messages and may subsequently turn off to stop reception of additional emergency broadcast messages until the next radio-on state. If desired, the radio may operate in an emergency broadcast message mode during which emergency broadcast message reception continues according to a timer based on whether received emergency broadcast messages are duplicates or are unique.

In some illustrative configurations, the detected emergency broadcast message may be a location-based emergency broadcast message including information indicative of a geographical area for which the emergency broadcast message is relevant. If desired, the emergency broadcast message may be conveyed (e.g., displayed) to a user when the user is in a geographical location regardless of whether the device is operating in a low-power mode.

In some illustrative configurations, one or more radio-on states may be allocated with a power budget. The radio may perform data transmission, data re-transmission, data reception, cell search, network search, and/or other operations based on the allocated power budget during the corresponding radio-on state.

In some illustrative configurations, the radio may align the radio-on states with periodic user equipment (device) registration and/or update operations such as IMS re-registration operations and Tracking Area Update operations for the LTE network.

An aspect of the disclosure provides a method of operating user equipment having wireless circuitry. The method can include operating a radio of the wireless circuitry in a radio-on state based on a duty cycle. The method can include receiving, by the radio, an emergency broadcast message while the radio is operating in the radio-on state. The method can include operating the radio beyond a duration defined by the duty cycle in response to receiving the emergency broadcast message.

An aspect of the disclosure provides a method of operating user equipment having a radio. The method can include operating the radio in a radio-on state during a first time period based on a power consumption threshold. The method can include operating the radio in the radio-on state during a second time period based on the power consumption threshold. The method can include operating the radio in a radio-off state during a third time period between the first time period and the second time period. The method can include, in response to reaching the power consumption threshold while operating the radio in the radio-on state during the first time period, switching to operating the radio in the radio-off state during the third time period.

An aspect of the disclosure provides a non-transitory computer-readable storage medium storing one or more computer-executable instructions. The non-transitory computer-readable storage medium can store instructions to perform a user equipment registration operation. The non-transitory computer-readable storage medium can store instructions to turn a radio component on based on a duty cycle. The non-transitory computer-readable storage medium can store instructions to perform one or more additional periodic operations associated with the user equipment registration operation during each instance of the radio component being turned on based on the duty cycle.

DETAILED DESCRIPTION

Figure 1:
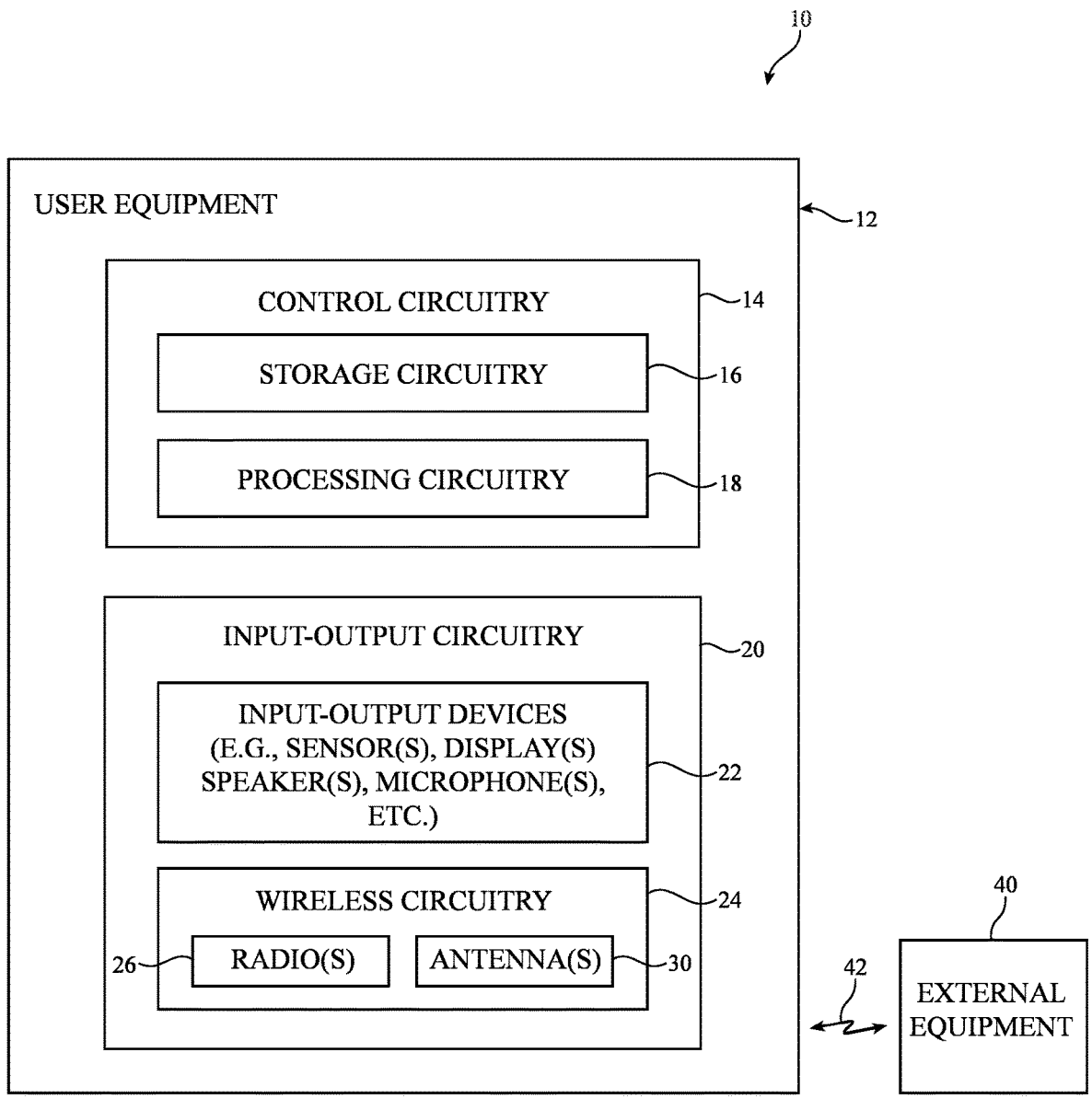
FIG. 1 is a block diagram of an illustrative electronic device having wireless circuitry in accordance with some embodiments.

User equipment 10 of FIG. 1 may be a wireless communication device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment. User equipment 10 may sometimes be referred to herein as electronic device 10 or device 10.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultrawideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors, temperature sensors, etc. In some configurations, keyboards, headphones, displays, pointing devices such as trackpads, mice, and joysticks, and other input-output devices may be coupled to device 10 using wired or wireless connections.

Input-output circuitry 20 may include wireless circuitry 24 to support wireless communications and/or radio-based spatial ranging operations. Wireless circuitry 24 may include one or more antennas 30. Wireless circuitry 24 may also include one or more radios 26. Each radio 26 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 30. These components of each radio 26 may be mounted onto a respective substrate or integrated into a respective integrated circuit, chip, package (e.g., system-in-package), or systemon-chip (SOC). If desired, the components of multiple radios 26 may share a single substrate, integrated circuit, chip, package, or SOC.

Antenna(s) 30 may be formed using any desired antenna structures. For example, antenna(s) 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Wireless circuitry 24 may include any desired number of antennas 30. Some or all of the antennas 30 in wireless circuitry 24 may be arranged into one or more phased antenna arrays (e.g., for conveying radio-frequency signals over a steerable signal beam). Filter circuitry, switching circuitry, impedance matching circuitry, and/or other antenna tuning components may be adjusted to adjust the frequency response and wireless performance of antenna(s) 30 over time.

Transceiver circuitry in radios 26 may convey radio-frequency signals using one or more antennas 30 (e.g., antenna(s) 30 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 30 may transmit the radio-frequency signals by radiating the radio-frequency signals into free space (or to free space through intervening device structures such as a dielectric cover layer). Antenna(s) 30 may additionally or alternatively receive the radio-frequency signals from free space (e.g., through intervening devices structures such as a dielectric cover layer). The transmission and reception of radio-frequency signals by antenna(s) 30 each involve the excitation or resonance of antenna currents on an antenna resonating element in the antenna by the radio-frequency signals within the frequency band(s) of operation of the antenna.

Each radio 26 may be communicatively coupled to one or more antennas 30 over one or more radio-frequency transmission lines. One or more radio-frequency transmission lines may be shared between radios 26 and/or antennas 30 if desired. Radio-frequency front end (RFFE) modules may be interposed on one or more radio-frequency transmission lines. The radio-frequency front end modules may include substrates, integrated circuits, chips, or packages that are separate from radios 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines.

Radios 26 may use antenna(s) 30 to transmit and/or receive radio-frequency signals within different frequency bands at radio frequencies (sometimes referred to herein as communications bands or simply as a "bands"). The frequency bands handled by radios 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 26 may transmit and/or receive radio-frequency signals according to a respective radio access technology (RAT) that determines the physical connection methodology for the components in the corresponding radio. One or more radios 26 may implement multiple RATs if desired. As just one example, the radios 26 in device 10 may include a UWB radio for conveying UWB signals using one or more antennas 30, a Bluetooth (BT) radio for conveying BT signals using one or more antennas 30, a Wi-Fi radio for conveying WLAN signals using one or more antennas 30, a cellular radio for conveying cellular telephone signals using one or more antennas 30 (e.g., in 4G frequency bands, 5G FR1 bands, and/or 5G FR2 bands), an NFC radio for conveying NFC signals using one or more antennas 30, and a wireless charging radio for receiving wireless charging signals using one or more antennas 30 for charging a battery on device 10. This example is merely illustrative and, in general, radios 26 may include any desired combination of radios for covering any desired combination of RATs. If desired, antenna(s) 30 may be operated using a multiple-input and multiple-output (MIMO) scheme and/or using a carrier aggregation (CA) scheme.

Radios 26 may use antenna(s) 30 to transmit and/or receive radio-frequency signals 42 to convey wireless communications data between device 10 and external wireless communications equipment 40 such as a base station, one or more other network components for a (radio) access network, one or more other network components linking device 10 to a core network, a wireless access point, etc. The wireless communications data conveyed by radios 26 may, for example, include data that has been encoded into corresponding data packets such as wireless data associated with a telephone call, streaming media content, internet browsing, wireless data associated with software applications running on device 10, email messages, etc.

The example of FIG. 1 is merely illustrative. While control circuitry 14 is shown separately from wireless circuitry 24 in the example of FIG. 1 for the sake of clarity, wireless circuitry 24 such as radio 26 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24 or radio 26).

Figure 2:
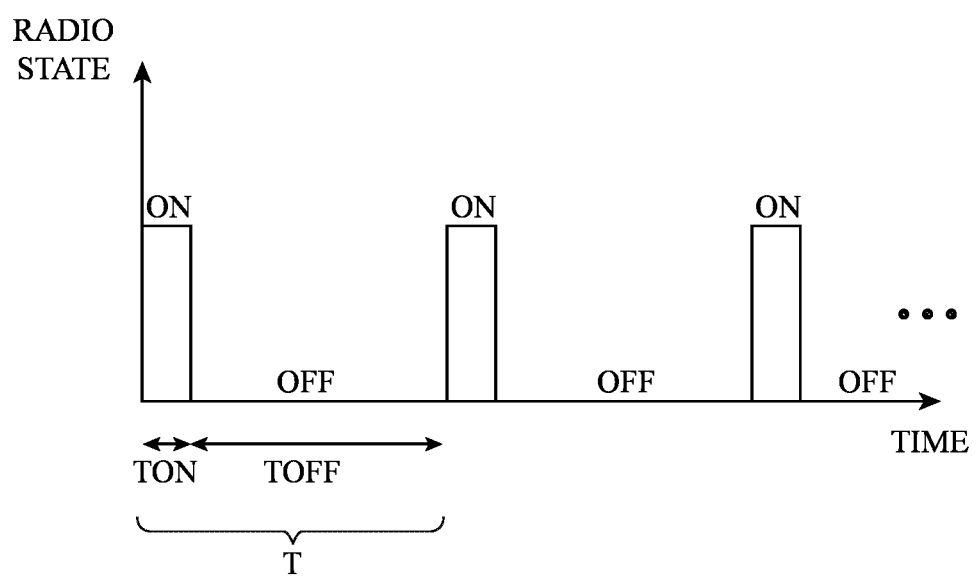
FIG. 2 is an illustrative timing diagram showing a radio operational mode in accordance with some embodiments.

In some illustrative configurations for device 10, radio 26 such as a cellular radio may be configured to cycle between on and off states in order to reduce impact to device battery life. As examples, this can help to generally extend the device battery life during normal device operations and/or to specifically extend operation in a low-power device operating mode during which device 10 is intended to reduce power usage. FIG. 2 is an illustrative timing diagram showing how radio 26 (e.g., one or more radio components for radio 26) can be placed in an on state during time period TON and placed in an off state during time period TOFF. Each on-off cycle may last a time period T and may occur with a regular periodicity (e.g., a fixed time period T across multiple cycles) or recur in other manners. Radio 26 may operate with any suitable number of (on-off) cycles. This type of operation may sometimes be referred to as operating radio 26 in an on-off mode.

As an example, radio 26 may be in an on state for a time period on the order of minutes (e.g., one minute, two minutes, five minutes, etc.), while radio 26 may be in an off state for a time period on the order of tens of minutes or hours (e.g., forty-five minutes, an hour, etc.). If desired, radio 26 may operate with an on-off duty cycle of less than 50%, less than 30%, less than 20%, less than 10%, greater than 1%, greater than 2%, etc. The duty cycle may be the ratio between time period TON and time period TOFF. These examples are merely illustrative.

By operating radio 26 in this manner, radio 26 can minimize power usage during time periods TOFF and perform any regular functions during time periods TON. As examples, in an on state, radio 26 may perform any suitable radio functionalities such as search for and/or communicate with a base station or other network equipment (e.g., external equipment 40 in FIG. 1), fetch data from a server (e.g., through equipment 40 in FIG. 1), perform network/user equipment configuration operations, and/or otherwise process and convey radio-frequency signals, and in an off state, radio 26 may be powered off, or may be in a low-power or standby state.

While operating radio 26 in the manner described in connection with FIG. 2 can reduce power usage, issues can arise when providing a user with device functionalities that can conflict with the on-off operating cycle of radio 26. As an illustrative scenario, radio 26 may detect emergency broadcasts such as CMAS (Commercial Mobile Alert System) broadcasts, ETWS (Earthquake and Tsunami Warning System) broadcasts, or other public warning system broadcasts, or other types of broadcasts (e.g., from elements in the (cellular) network, through elements in the radio access network, through base stations, etc.) during the time period in which radio 26 is on (e.g., during time period TON). However, because these types of emergency broadcasts can last a variable amount of time such as from a few minutes to a number of hours, it can be challenging to convey the messages associated with the emergency broadcasts to a user while operating radio 26 in a predicable or deterministic manner.

Figure 3:
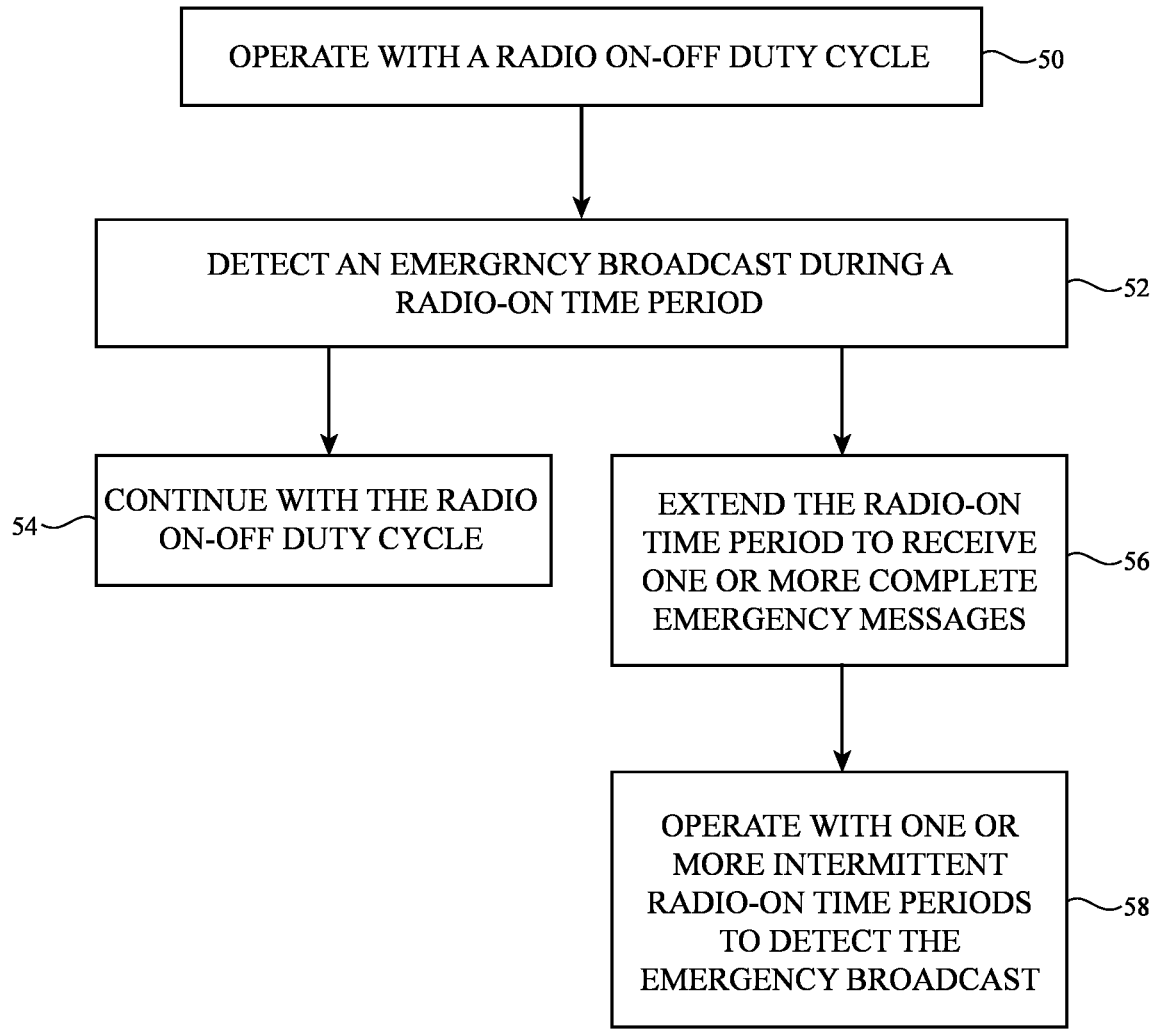
FIG. 3 is a flowchart of illustrative operations for handling an emergency broadcast in accordance with some embodiments.

FIG. 3 is a flowchart showing illustrative operations for handling an emergency broadcast. Configurations in which one or more processors of radio 26 are configured to perform one or more (e.g., all) of the operations of FIG. 3 stored as software instructions on storage circuitry (e.g., a non-transitory computer-readable storage medium) associated with radio 26 are described herein as illustrative examples. If desired, other components of device 10 such as one or more processors of control circuitry 14, input-output devices 22, etc., may be configured to perform one or more of the operations of FIG. 3.

As shown in FIG. 3, at operation 50, the one or more processors of radio 26 may operate radio 26 (e.g., one or more portions of radio 26) with a radio on-off duty cycle such as the one described in connection with FIG. 2.

At operation 52, the one or more processors of radio 26 may detect an emergency broadcast during a radio-on time period TON while radio 26 is in an on state.

In one suitable arrangement, after operation 52, the one or more processors of radio 26 may proceed with operation 54 to continue operating based on the same radio on-off duty cycle. In this arrangement, at the end of the radio-on time period TON, the one or more processors of radio 26 may place radio 26 in an off state to start radio-off time period TOFF regardless of the status of reception for the emergency broadcast. In particular, the one or more processors of radio 26 may receive information associated with the emergency broadcast in segments. Not all segments may have been received during the radio-on time period TON. As such, radio 26 has not received all of the information needed to fully construct the emergency broadcast message corresponding to the emergency broadcast, and consequently, the emergency broadcast message is not conveyed to the user. Advantageously, in this arrangement, radio 26 can maintain consistent power consumption as operation using the radio on-off duty cycle remains unchanged. When radio 26 operates based on operation 54, device 10 (e.g., one or more processors of control circuitry 14) be configured to inform the user beforehand that emergency broadcast message reception is not possible and/or to prompt user input to operate based on operation 54 using input-output devices as a display. If desired, operation 54 may be used in scenarios where device 10 has limited remaining power and/or is operating in a low-power mode to reserve power for other device functionalities.

In one suitable arrangement, after operation 52, the one or more processors of radio 26 may proceed with operation 56 to extend radio-on time period TON and operate radio 26 in the on state to allow additional time to receive all of the segments of the emergency broadcast. In this way, radio 26 may receive all of the information needed to fully construct the emergency broadcast message. Device 10 (e.g., the one or processors of control circuitry 14 using a display) may subsequently display the emergency broadcast message to the user. After extending the radio-on time period TON to receive all of the segments of the emergency broadcast, the one or more processors of radio 26 may switch to the off state and proceed with the on-off duty cycle. Advantageously, extending radio-on time period TON by an amount of time sufficient to receive all of the segments of the emergency broadcast may have a small impact on power consumption (relative to the arrangement associated with operation 52), while allowing the emergency broadcast message to be conveyed to the user.

If desired, the one or more processors of radio 26, at operation 56, may further extend the radio-on time period TON and operate radio 26 in an on state to allow for reception of subsequent emergency broadcast messages associated with the emergency broadcast (e.g., as long as the emergency broadcast from the network is ongoing). This may lead to consumption of large amounts of power as radio 26 operates in an on state for the duration of the emergency broadcast (which could last hours), but may provide the user with real-time information associated with the emergency broadcast. To reduce power consumption and the risk of operating radio 26 in an on state for a prolonged period of time, the one or more processors of radio 26 may set a timer with a duration indicative of when radio 26 should be switched to an off state. As an example, the one or more processors of radio 26 may set a timer for N minutes starting from the reception of the emergency broadcast. During the N minutes, radio 26 may receive any number of emergency broadcast messages associated with the emergency broadcast and convey one or more of them to the user. After the N minutes or the expiry of the timer, the one or more processors of radio 26 switch radio 26 into an off state to preserve power.

In one suitable arrangement, instead of extending the radio-on time period TON continuously to receive one or more subsequent emergency broadcast messages, the one or more processors of radio 26, at operation 58, may operate radio 26 with one or more intermittent radio-on time periods to switch radio 26 on intermittently to detect the emergency broadcast while reducing power consumption. In particular, after receiving the first complete emergency broadcast message, radio 26 may be switched to an off state, and subsequently, switched back on periodically to receive subsequent emergency broadcast messages (if the emergency broadcast is still ongoing). If the emergency broadcast has stopped, the intermittent radio-on time periods may also stop. These intermittent radio-on time periods may occur during what would otherwise be time period TOFF in FIG. 2 and may be followed up by the subsequent time period TON. As examples the intermittent radio-on time periods may have a regular (same) periodicity or may have an irregular periodicity (e.g., the first radio-on time period is separated from the second radio-on time period by N minutes, the second radio-on time period is separated from the third radio-on time period by 2N minutes, the third radio-on time period is separated from the fourth radio-on time period by 5N minutes, etc.).

Figure 4:
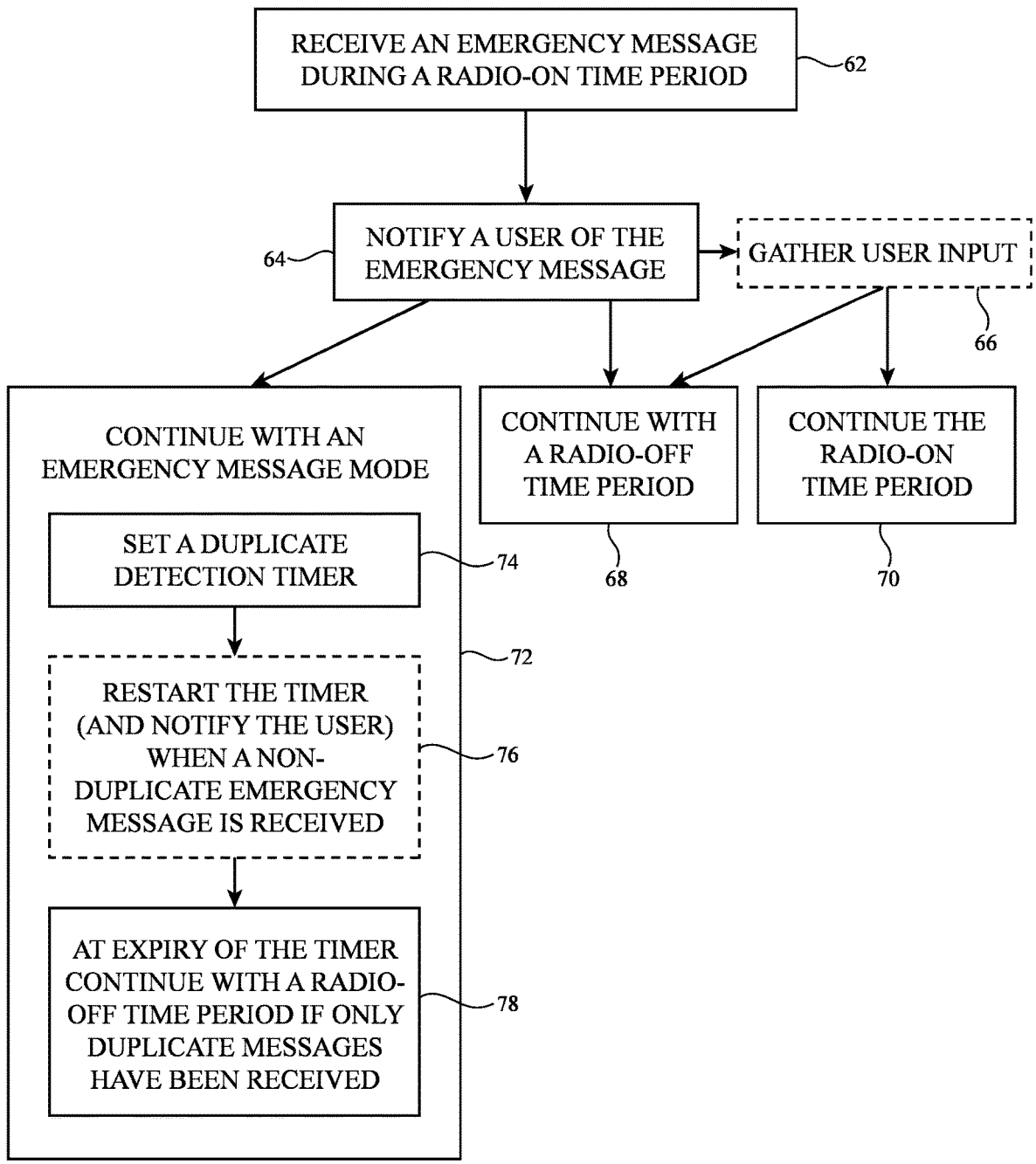
FIG. 4 is a flowchart of illustrative operations for continuing radio operations after receiving an emergency broadcast message in accordance with some embodiments.

FIG. 4 is a flowchart showing illustrative operations for handling emergency broadcast messages based on user input and/or based on an emergency (broadcast) message mode as illustrative extensions of the operations of FIG. 3. Configurations in which one or more processors of radio 26 are configured to perform one or more (e.g., all) of the operations of FIG. 4 stored as software instructions on storage circuitry (e.g., a non-transitory computer-readable storage medium) associated with radio 26 are described herein as illustrative examples. If desired, other components of device 10 such as one or more processors of control circuitry 14, input-output devices 22, etc., may be configured to perform one or more of the operations of FIG. 4.

As shown in FIG. 4, at operation 62, the one or more processors of radio 26 may receive an emergency (broadcast) message during a radio-on time period (e.g., a normal radio-on time period TON in FIG. 2 or an extended radio-on time period described in operation 56 in FIG. 3).

At operation 64, the one or more processors of radio 26 may convey the received emergency message to control circuitry 14. Device 10 (e.g., the one or more processors of control circuitry 14) may notify a user of the received emergency (broadcast) message. As an example, the one or more processors of control circuitry 14 may display a visual notification or alert on a display of device 10 associated with the received emergency (broadcast) message.

In order to simplify the operation of radio 26 and reduce power consumption, the one or more processors of radio 26 (after receiving the single emergency message), may proceed to operation 68 to switch radio 26 to an off state. By processing with operation 68, radio 26 may miss one or more subsequent emergency broadcast messages.

Given the tradeoffs between power consumption and being informed on emergency messages, it may be desirable to gather user input to inform radio operations. Accordingly, before, while, or after notifying the user of the emergency message at operation 64, device 10 (e.g., input-output devices 22) may gather user input at operation 66. The user input may be indicative of the operation (operation 68 or 70) with which the one or more processors of radio 26 proceeds.

In an illustrative scenario, device 10 may be operating in a low-power mode, and accordingly, radio 26 may operate based on an on-off duty cycle (FIG. 2) to preserve power in accordance with the low-power operating mode. In this scenario, at operation 66, device 10 may prompt the user to select between exiting the low-power operating mode (and receiving subsequent emergency messages) or continuing with the low-power operating mode (and forgoing subsequent emergency message reception). In response to the user selecting to continuing the low-power operating mode, the one or more processors of radio 26 may proceed to operation 68 to switch radio 26 off. In response to the user selecting to exiting the lower-power operating mode, the one or more processors of radio 26 may proceed to operation 68 to operate radio 26 in an on state. If desired, this type of user input may be gathered once or may be gathered periodically while device 10 operates in the low-power mode.

In one illustrative arrangement, radio 26 may be configured to operate in an emergency broadcast message mode. The emergency message mode may be an emergency message only mode in which radio 26 only receives and performs processing on data associated with emergency broadcast messages. In particular, the one or more processors of radio 26 may proceed with operation 72 to switch to an emergency message mode of operation after the radio-on time period (e.g., after receiving the first emergency message during the radio-on time period at operation 62).

While operating in the emergency message mode, the one or more processors of radio 26 may process one or more of operations 74, 76, and 78. In particular, the one or more processors of radio 26, at operation 74, may set a duplicate detection timer having any suitable duration (e.g., five minutes, ten minutes, etc.). If desired, the duplicate timer may be set and started when the first emergency message is received (at operation 62). If during the duration of the duplicate detection timer, only duplicate emergency broadcast messages have been received by radio 26, the one or more processors of radio 26, at operation 78, may switch radio 26 from the emergency message mode to an off state at an expiry of the timer. In particular, duplicate emergency broadcast messages may be emergency broadcast messages having the same identifier (ID) or conveying the same information (even if in different languages).

If a non-duplicate emergency broadcast message (e.g., not a duplicate of the message received at operation 62) is received during the duration of the duplicate detection timer, the one or more processors of radio 26, at operation 76, may restart the duplicate detection timer. The non-duplicate emergency message may be conveyed to the user in an analogous manner as described in connection with operation 64 for the first emergency message. In this scenario, the one or more processors of radio 26 may process operation 78 at an expiry of the restarted duplicate detection timer (e.g., if all emergency broadcast messages received are duplicates of the two unique emergency broadcast messages, radio 26 may be switched to an off state).

If desired, the one or more processors of radio 26 may set an additional timer (in addition to the duplicate detection timer) with a duration indicative of when radio 26 should be switched to an off state. This additional time may sometimes be referred to herein as a guard timer. If desired, the guard timer may also be set and started when the first emergency message is received (at operation 62). At the expiry of the guard timer (regardless of the status of the duplicate detection timer), the one or more processors of radio 26 may switch radio 26 to an off state. The guard timer may have any suitable duration. If desired, the duration of the guard timer may be longer than the duration of the duplicate detection timer as the guard timer may serve as a failsafe to preserve power in case of prolonged emergency message reception (e.g., if operation 62 is repeatedly processed intentionally or erroneously).

Figure 5:
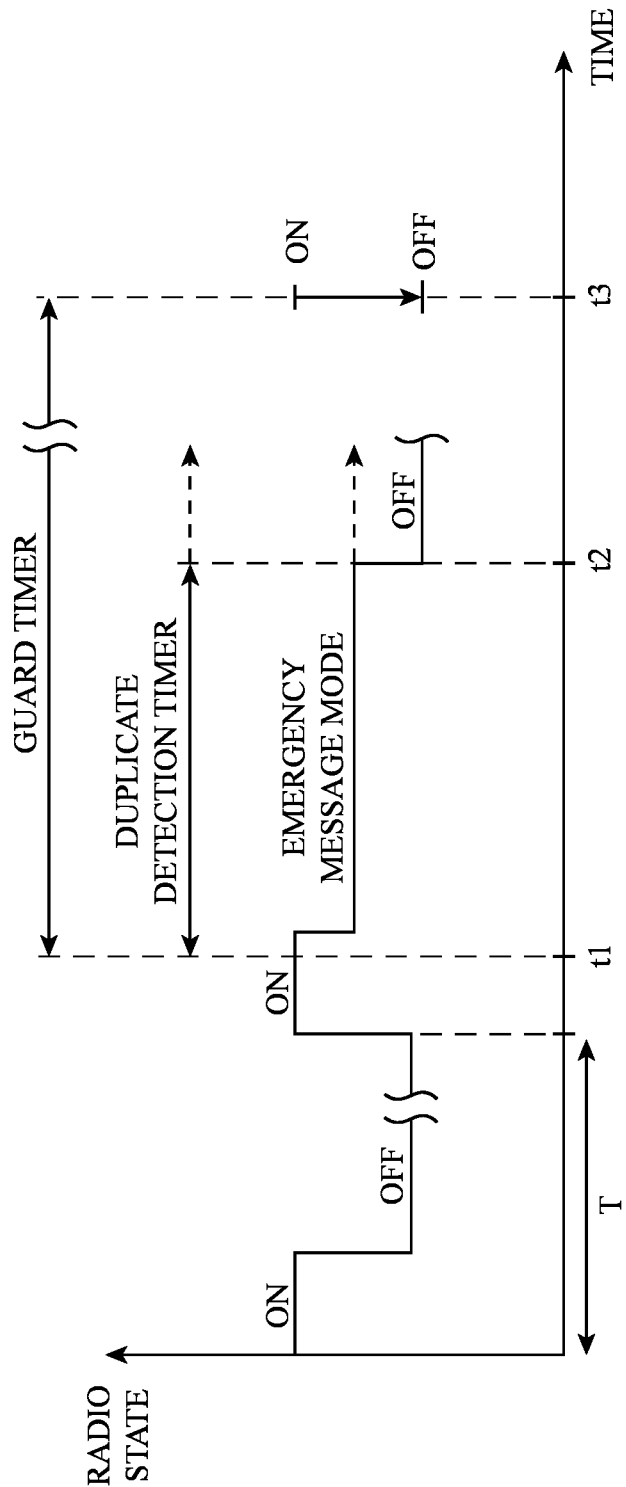
FIG. 5 is an illustrative timing diagram showing emergency broadcast handling using an emergency message mode in accordance with some embodiments.

FIG. 5 is an illustrative timing diagram showing a radio operation in an emergency broadcast message mode. As shown in FIG. 5, while operating using an on-off cycle, at time t1 radio 26 may detect an emergency broadcast and receive an emergency broadcast message. At the same time t1, radio 26 may start a guard timer as well as a duplicate detection timer.

After receiving the first emergency broadcast message, radio 26 may switch from the on state to operating in the emergency (broadcast) message mode, during which detection and reception of (duplicate and unique) emergency broadcast messages can occur. At the expiry of duplication detection timer at time t2, if only duplicate emergency broadcast messages (having the same identifier) have been received during the duration of the duplicate detection timer, radio 26 may switch from operating in the emergency broadcast message mode to an off state.

In some scenarios where additional unique emergency messages are received between times t1 and t2, the duplicate detection timer may be restarted at the reception of the first additional unique emergency message. Accordingly, the restarted duplicate detection timer may expire after time t2, and operation in the emergency broadcast message mode may also proceed past time t2. In scenarios where radio 26 is operating in a non-off state when the guard timer expires (at time t3), radio 26 may switch to the off state, from either an on state or operation in an emergency broadcast message mode (e.g., if restarted duplicate detection timer extends significantly past time t2 and extends to time t3). If desired, the time period from time t1 to time t3 may be shorter than time period T associated with the on-off cycle or shorter than time period TOFF (FIG. 2) associated with the off state of the cycle.

While the example in FIG. 5 describes operation of radio 26 in an emergency broadcast message mode following one or more on-off cycles, this is merely illustrative. If desired, the on state of radio 26 preceding the emergency broadcast message mode may be used by other active radio operations such as user-initiated activities (e.g., mobile-originated or mobile-terminated calls that include voice and data).

Some emergency broadcast messages may be relevant to a geographical area (e.g., associated with an event that occurred in or near the geographical area, an event that affects areas in or near the geographical area, etc.) and/or may include information indicative of the geographical area such as longitudinal and latitudinal boundaries. These types of emergency broadcast message may sometimes be referred to as location-based emergency broadcast messages or geofenced emergency broadcast messages. While location-based emergency broadcast messages may be relevant to a certain geographical area, they may still be received outside the certain geographical area.

In illustrative scenarios where device 10 operates in a low-power mode and radio 26 operates in an on-off mode to reduce power consumption in accordance with the low-power mode, conflicts may arise when handling location-based emergency broadcast messages.

Figure 6:
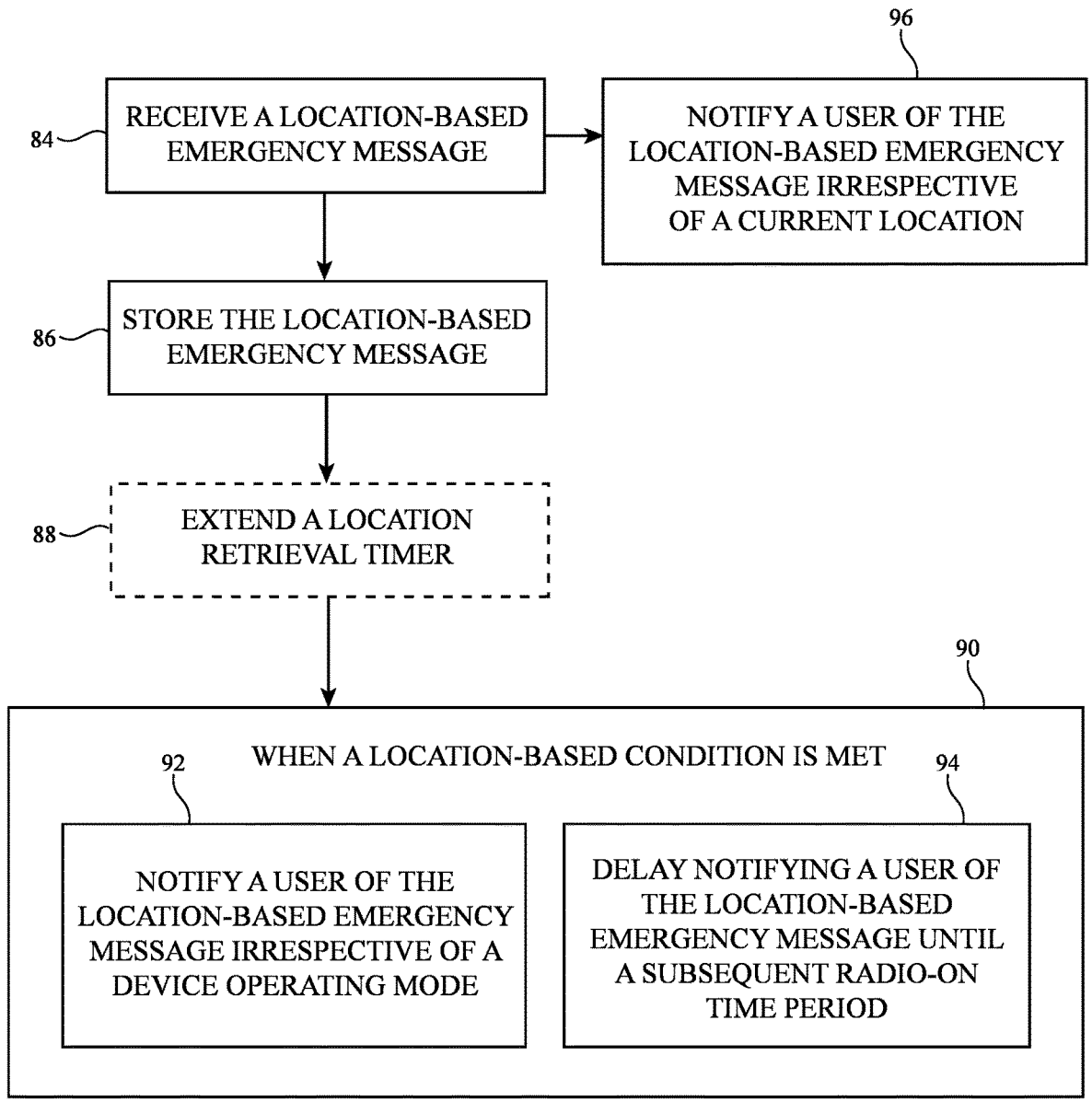
FIG. 6 is a flowchart of illustrative operations for handling a location-based emergency broadcast message in accordance with some embodiments.

FIG. 6 is a flowchart showing illustrative operations for handling a location-based emergency (broadcast) message. Configurations in which one or more processors of radio 26 are configured to perform one or more (e.g., all) of the operations of FIG. 6 stored as software instructions on storage circuitry (e.g., a non-transitory computer-readable storage medium) associated with radio 26 are described herein as illustrative examples. If desired, other components of device 10 such as one or more processors of control circuitry 14, input-output devices 22, etc., may be configured to perform one or more of the operations of FIG. 6.

As shown in FIG. 6, at operation 84, the one or more processors of radio 26 may detect a location-based emergency broadcast and may receive the corresponding location-based emergency broadcast message. In an illustrative configuration described herein as an example, operation 84 may occur while radio 26 operates in an on-off mode (FIG. 2) and the corresponding location-based emergency broadcast message is received while the radio 26 is in one of the on states.

The received location-based emergency broadcast message received by radio 26 may be conveyed to control circuitry 14. In scenarios where the one or more processors of control circuitry 14 determines device 10 does not meet the location-based condition (e.g., is not within the geographical area specified by the received location-based emergency message), one or more processors of control circuitry 14 may be configured to convey the received location-based emergency broadcast message to storage circuitry 16 for storage at operation 86.

In order to determine whether device 10 meets the location-based condition (e.g., is within the geographical area specified by the received location-based emergency message), device 10 (e.g., the one or more processors of control circuitry 14) may use portions of input-output circuitry 20 (e.g., wireless circuitry such as GPS circuitry, Wi-Fi circuitry, Bluetooth circuitry, cellular circuitry, and sensors such as magnetometers, barometers, etc.) to determine a geo-location of device 10 and enable geofencing to determine when device 10 has entered the geographical location. While device 10 is operating in the low-power mode, it may be more difficult for the one or more processors of control circuitry 14 to determine the location of device 10 and consequently whether device 10 has entered the geographical location within a normal location monitoring timer. As such, at operation 88, the one or more processors of control circuitry 14 may be configured to extend the location retrieval timer at operation 88. This may help increase the likelihood of the one or more processors of control circuitry 14 retrieving the geo-location of device 10.

When the location-based condition is met or satisfied (e.g., when device 10 has entered the geographical area specified by the location-based emergency broadcast message), the one or more processors of radio 26 and control circuitry 24 may proceed to operation 90.

In one illustrative arrangement, at operation 92 (after the location-based condition is met), the one or more processors of control circuitry 14, using a display, may notify the user of the location-based emergency broadcast message irrespective of the operating mode of device 10 (e.g., even if device 10 is operating in a low-power mode). Advantageously, in this arrangement, minimal additional radio power consumption is required since the location-based emergency broadcast message has already been previously processed (e.g., decoded on reception), and the user can be notified of a geo-location-relevant emergency broadcast message.

However, when device 10 is operating in a low-power mode, a user may not be expecting to see any alerts (e.g., the user may be notified that no alerts will be provided upon confirmation that device 10 will operate in the low-power mode). Accordingly, operation 92 may sometimes provide inconsistent user experience. To provide a more consistent user experience, the notification to the user confirming that device 10 will operate in the low-power mode may include reference to the possibility of receiving (location-based) emergency broadcast messages while in the low-power mode.

As an alternative to operation 92, the one or more processors of control circuitry 24 may, at operation 94 (after the location-based condition is met), delay notifying the user of the location-based emergency message until an (immediately) subsequent radio-on time period (e.g., when device 10 is no longer operating in the low-power mode). This may also provide a consistent user experience. However, if device 10 has left the geographical area already by the subsequent radio-on time period, the stored location-based emergency broadcast message may be wasted (e.g., may never be displayed to the user).

If desired, in some scenarios, the one or more processors of control circuitry 14 may disable geofencing and proceed with, at operation 96, notifying a user of the location-based emergency broadcast message irrespective of a current location of device 10 (regardless of whether device 10 meets the location-based condition). In such a manner, radio and/or control circuitry operations may be simplified and power consumption may be reduced (e.g., to meet a particular device power consumption target).

To provide predicable power consumption characteristics, radio 26, when operating based on an on-off cycle (FIG. 2), may be configured to exhibit a fixed power consumption behavior during each of the on states in the on-off cycle (e.g., during TON in FIG. 2).

Figure 7:
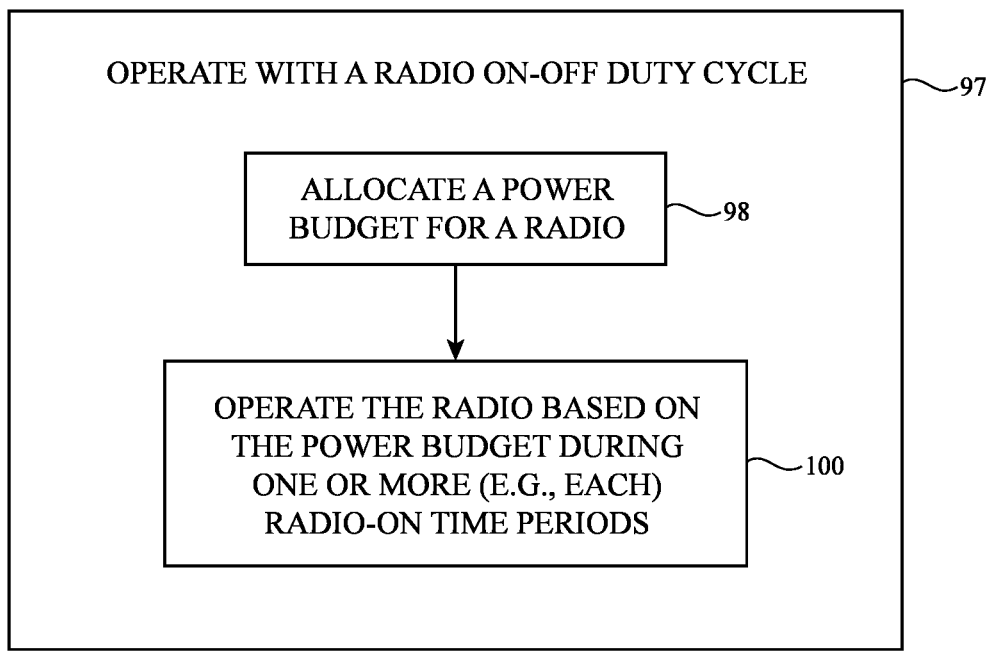
FIG. 7 is a flowchart of illustrative operations for a radio based on a power budget in accordance with some embodiments.

FIG. 7 is a flowchart showing illustrative operations for operating radio 26 in an on-off mode based on a power budget or a power consumption threshold. Configurations in which one or more processors of radio 26 are configured to perform one or more (e.g., all) of the operations of FIG. 7 stored as software instructions on storage circuitry (e.g., a non-transitory computer-readable storage medium) associated with radio 26 are described herein as illustrative examples. If desired, other components of device 10 such as one or more processors of control circuitry 14, input-output devices 22, etc., may be configured to perform one or more of the operations of FIG. 7.

As shown in FIG. 7, at operation 97, the one or more processors of radio 26 may operate with a radio on-off duty cycle (e.g., in the on-off mode of operation in FIG. 2).

In order to reduce power consumption and/or meet a power consumption target, the one or more processors of control circuitry 14 (e.g., power management circuitry) may allocate a power budget for radio 26 at operation 98 (when radio 26 is operating in the on-off mode of operation).

Accordingly, the one or more processors of control circuitry 14 may operate the radio based on the power budget during one or more (e.g., each) radio-on time periods at operation 100. In other words, the one or more processors of radio 26 may perform one or more operations during the one or more (e.g., each) radio-on time periods in such a manner as to not exceed a power consumption threshold for the allocated power budget. The power consumption threshold may be a cumulative power consumption threshold, which is compared to the cumulative power consumption associated with all operations during a given radio-on time period. A same fixed cumulative power consumption threshold may be used for each radio-on time period. Any suitable power consumption threshold values may be used.

Figure 8:
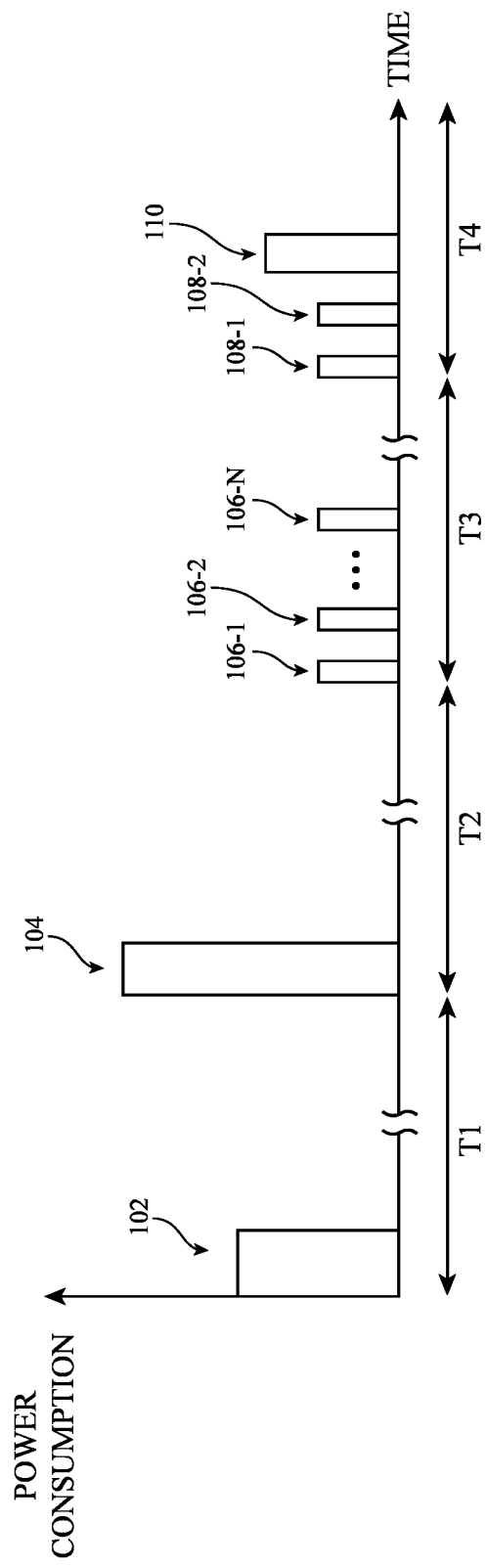
FIG. 8 is an illustrative timing diagram showing different radio operations based on a power budget in accordance with some embodiments.

FIG. 8 is an illustrative timing diagram showing illustrative operations that may be performed by radio 26 during one or more of the radio-on time periods to meet the allocated power budget as described in connection with operation 100 in FIG. 7.

As shown in FIG. 8, during a first illustrative radio-on state in on-off cycle T1, radio 26 may perform operation 102. Operation 102 may be characterized by radio 26 (e.g., a cellular radio) finding (cellular) service when powered on and operating with a good channel condition. Accordingly, data transfer by radio 26 completes after a first (optimal) duration.

During a second illustrative radio-on state in on-off cycle T2, radio 26 may perform operation 104. Operation 104 may be characterized by radio 26 finding service when power on but operating in a poor channel condition. Accordingly, due to the poor channel condition, radio 26 may need to transmit and retransmit data at an elevated power level (a power level higher than the one used during operation 102) during operation 104. Given the use of the elevated power level and the fixed allocated power budget (e.g., operations 102 and 104 consume the same amount of power), radio 26 may perform operation 104 for a shorter duration than when performing operation 102. In some scenarios, this may lead to data transfer failures.

During a third illustrative radio-on state in on-off cycle T3, radio 26 (e.g., a cellular radio) may perform operations 106 (collectively referring to operations 106-1, 106-2, . . . , 106-N). Operations 106 may be characterized by radio 26 being out of the (cell) coverage area and performing cell search (scans). In particular, radio 26 may perform operation 106-1 representing a first cell search operation. Because no cell was found during the first cell search operation, after a suitable sleep interval, radio 26 may perform operation 106-2 representing a second cell search operation. As long as no cell has been found, radio 26 may perform a subsequent cell search operation until all of the allocated power budget has been used. In such a manner, the cumulative power consumption of operations 106 is the same as that of operation 104 and the same as that of operation 102.

The sleep intervals between adjacent cell search operations may be regular intervals or irregular intervals. In some illustrative configurations, larger sleep intervals may lead to missed opportunities to find service, but may prolong the cell search process (e.g., in case device 10 is slowly moving into a coverage area).

During a fourth illustrative radio-on state in on-off cycle T4, radio 26 (e.g., a cellular radio) may perform operations 108-1, 108-2, and 110. Operations 108-1, 108-2, and 110 may be characterized by radio 26 being out of the (cell) coverage area, performing cell search (scans), and ultimately finding service. In particular, radio 26 may perform operation 108-1 representing a first cell search operation. Because no cell was found during the first cell search operation, after a suitable sleep interval, radio 26 may perform operation 108-2 representing a second cell search operation. Radio 26 may find service after second cell search operation 108-2 and initiate a data transfer operation (e.g., transmission operation) represented by operation 110. Radio 26 may terminate operation 110 as soon as the allocated power budget is reached. In some scenarios, this may lead to data transfer failures.

The example of FIG. 8 illustrating how radio can perform different operations based on the same allocated power budget is merely illustrative. The different operations in FIG. 8 may not occur sequential as depicted. Some operations may occur without the others, while some operations may occur in different orders. Additionally, radio operations other than the ones shown in FIG. 8 may also occur during any of the shown radio-on time periods. These radio operations may also use the allocated power and may limit the power available for cell search, data transmission, data retransmission, data reception, cell search, etc. If desired, the description in connection with cell search may similarly be applicable to PLMN (Public Land Mobile Network) search. While FIG. 8 was described in connection with on-off cycles, if desired, one or more portions of the off-cycles may be replaced by other radio operating modes such as an emergency broadcast message mode as described in connection with FIGS. 4 and 5.

In some illustrative configuration, while radio 26 is operating with a radio on-off mode (FIG. 2), radio 26 may also want to accommodate for one or more user equipment registration and/or update operations.

Figure 9:
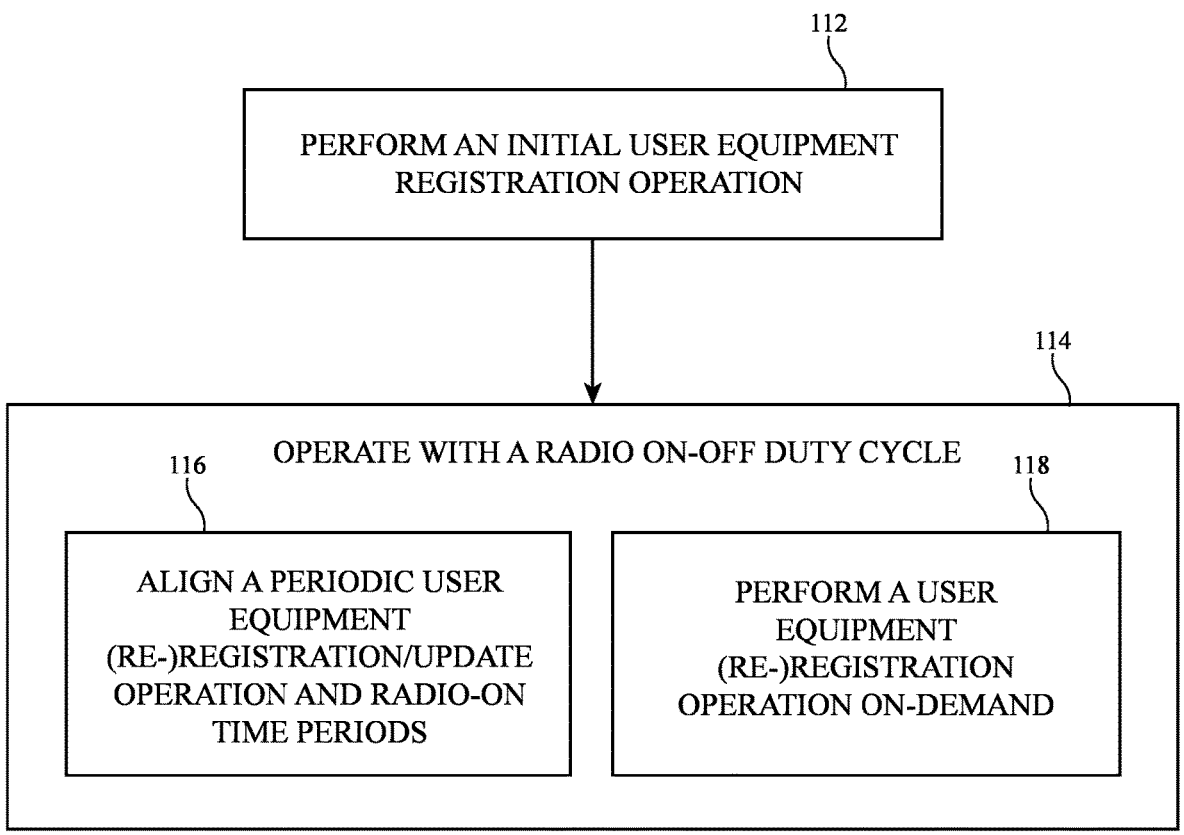
FIG. 9 is a flowchart of illustrative operations for performing user equipment registration or update during a radio operational mode in accordance with some embodiments.

FIG. 9 is a flowchart showing illustrative operations for performing user equipment registration or update during a radio on-off mode. Configurations in which one or more processors of radio 26 are configured to perform one or more (e.g., all) of the operations of FIG. 9 stored as software instructions on storage circuitry (e.g., a non-transitory computer-readable storage medium) associated with radio 26 are described herein as illustrative examples. If desired, other components of device 10 such as one or more processors of control circuitry 14, input-output devices 22, etc., may be configured to perform one or more of the operations of FIG. 9.

As shown in FIG. 9, at operation 112, the one or more processors of radio 26 may perform an initial user equipment registration operation. In one illustrative arrangement, the initial user equipment registration operation may be a registration operation for an IMS (IP Multimedia Subsystem), through which various services such as voice, multimedia, or generally data may be provided through the IP protocol. In one illustrative arrangement, the initial user equipment registration operation may be a registration operation for a (cellular) network (e.g., network attachment) such as for an LTE (Long-Term Evolution) network.

In both of these arrangements (and other arrangements, if suitable), it may be desirable for the user equipment 10 to perform periodic re-registration and/or update operations. However, operating radio 26 with on-off cycle (e.g., at operation 114) can conflict with one or more of these periodic operations because these periodic operations may occur during what would otherwise be the off state for radio 26 and/or may lead to extraneous operations being performed, thus increasing power consumption.

To mitigate these issues, the one or more processors of radio 26 (while operating radio in the on-off mode), at operation 116, may align the periodic user equipment (re-registration or update) operation and the radio-on time periods.

In the illustrative IMS registration arrangement, a network operator may define a IMS registration expiry timer value. Before the expiry of the timer, user equipment may perform an IMS re-registration operation. Accordingly, the one or more processors of radio 26, at operation 116, may align each periodic IMS re-registration operation and a corresponding radio-on state in the on-off cycle. As examples, the radio-on operating states may be aligned with (e.g., shifted to overlap) the periodic IMS re-registration operations, or the periodic IMS re-registration operations may be aligned with (e.g., shifted to overlap) the radio-on operating states. If desired, the periodicity of the on-off cycle may be modified to be less than the IMS registration expiry timer value.

If desired, in the illustrative IMS registration arrangement (or in other arrangements), the one or more processors of radio 26, at operation 118, may perform the user equipment re-registration on-demand instead of periodically. As an example, when the user initiates a voice call or any other service provided by the IMS, the one or more processors of radio 26 may perform the user equipment re-registration (e.g., when radio 26 is in the radio-off state in the on-off cycle) only when necessary. Doing so omits the need for persistent IMS re-registration and decreases power consumption in some scenarios.

In the illustrative network attachment arrangement such as for an LTE network, a Periodic Tracking Area Update timer (T3412) may be specified by 3GPP wireless communications standards. Before the expiry of the timer, user equipment may perform a periodic Tracking Area Update operation. Accordingly, the one or more processors of radio 26, at operation 116, may align each periodic Tracking Area Update operation and a corresponding radio-on state in the on-off cycle. The radio-on operating states may be aligned with (e.g., shifted to overlap) the periodic Tracking Area Update operations. By performing these periodic Tracking Area Update operations, the user equipment can comply with the Periodic Tracking Area Update timer, and the user equipment's LTE registration context can be maintained at the Mobility Management Entity (MME).

Figure 10:
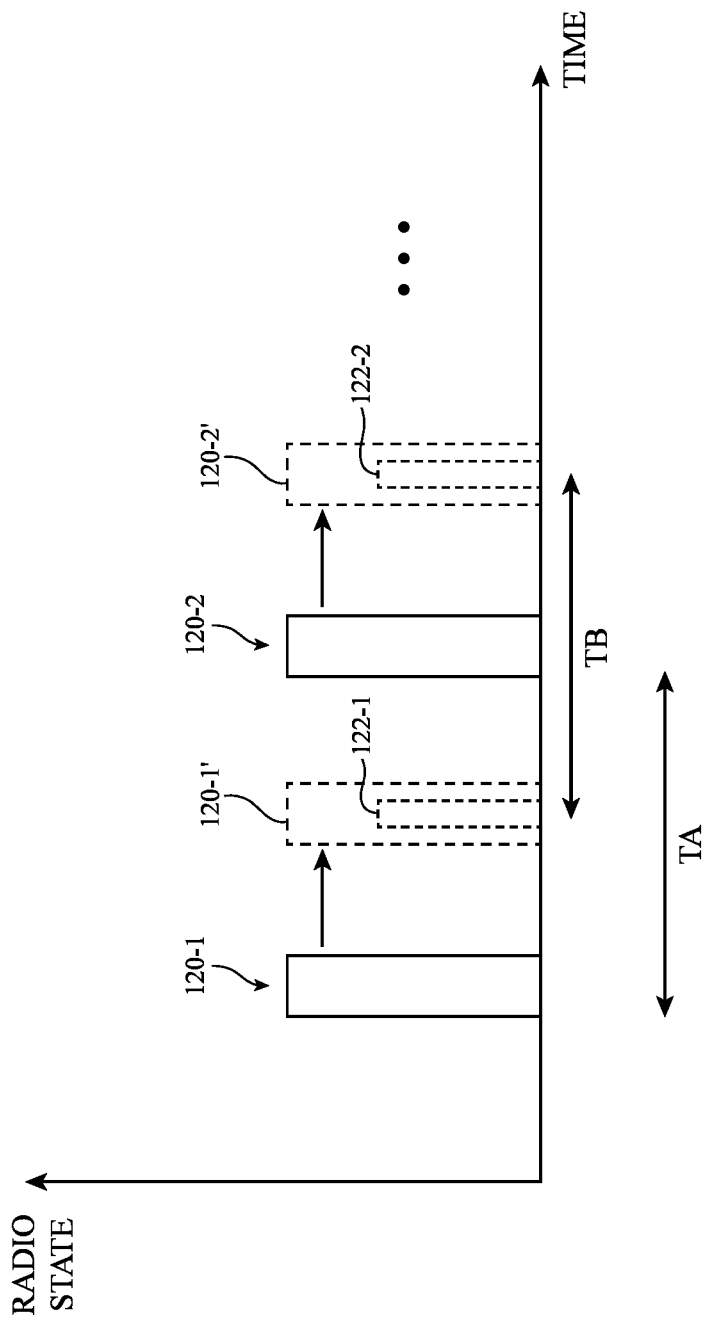
FIG. 10 is an illustrative timing diagram showing overlapping of radio operations with user equipment registration or update in accordance with some embodiments.

FIG. 10 is an illustrative timing diagram showing the alignment of the radio-on states with the IMS re-registration operation, the Tracking Area Update operation, or any other suitable registration or update operations (as described in connection with operation 116 in FIG. 9). As shown in FIG. 10, radio 26 may operate with on-states 120-1, 120-2, etc., separated by time period TA (e.g., as part of the radio on-off mode of operation). Radio 26 may desirably implement (re)-registration or update operations 122-1, 122-2, etc., such as IMS re-registration operations and the Tracking Area Update operations separated by time period TB. The radio-on states 120-1, 120-2, etc., may be shifted (as indicated by positions 120-1', 120-2', etc.) to temporally overlap registration or update operations 122-1, 122-2, etc. In such a manner, radio 26 may operate in shifted on-states 120-1', 120-2', etc., during which radio 26 may also perform registration or update operations 122-1, 122-2, etc. If desired, the periodicity of the on-off cycle (e.g., associated with time period TA) may be updated to the periodicity of the registration or update operations (e.g., associated with time period TB), if not already the same.

Figure 11:
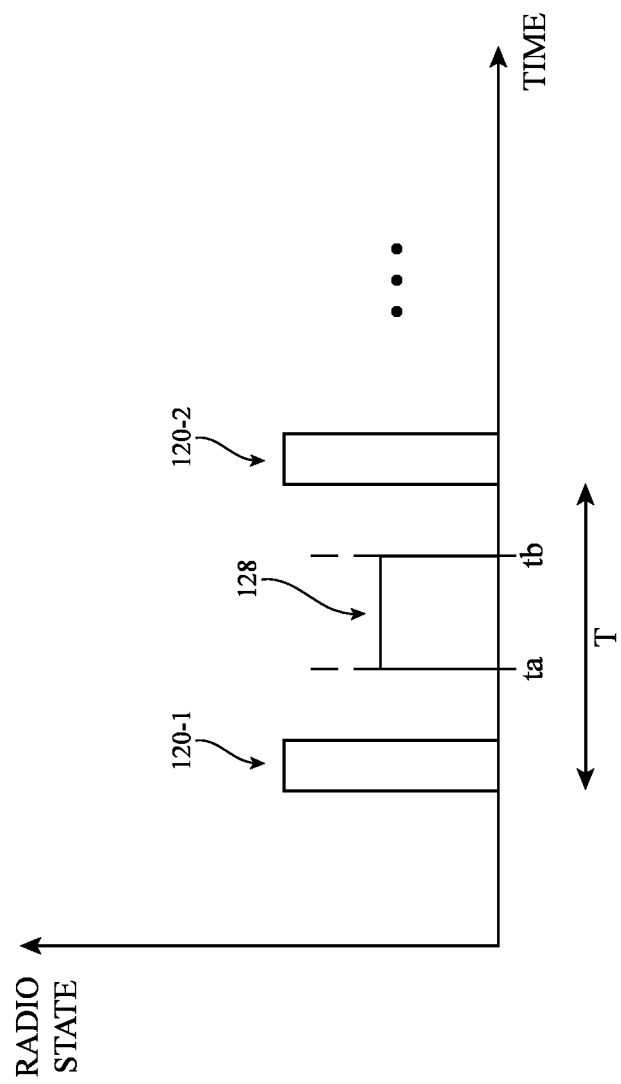
FIG. 11 is an illustrative timing diagram showing on-demand user equipment registration in accordance with some embodiments.

FIG. 11 is an illustrative timing diagram showing an on-demand IMS re-registration operation (as described in connection with operation 118 in FIG. 9). As shown in FIG. 11, radio 26 may operate with on-states 120-1, 120-2, etc. separated by time period T (e.g., as part of the radio on-off mode of operation). Rather than performing periodic IMS re-registration operations (whether or not aligned with the radio-on states), radio 26 may perform IMS re-registration only in response to an event that requires IMS services occurring. In the examples of FIG. 11, an event such as a user initiating a voice call requiring IMS services may occur at time ta between the periodic on-states 120-1 and 120-2 (e.g., when radio 26 would otherwise be in a radio-off state). Radio 26 may, at time ta, also begin and perform an IMS re-registration operation. Accordingly, when IMS services are no longer used (e.g., when the voice call ends) and the IMS registration is no longer necessary (at time tb), radio 26 may perform a de-registration operation.

The foregoing is merely illustrative and various modifications can be made to the described embodiments. The foregoing embodiments may be implemented individually or in any combination.

What is claimed is:

1. A method of operating user equipment having wireless circuitry comprising:
   operating a radio of the wireless circuitry in a radio-on state based on a duty cycle;
   receiving, by the radio, an emergency broadcast message while the radio is operating in the radio-on state; and
   operating the radio in an emergency broadcast message mode during which the radio receives one or more additional emergency broadcast messages beyond a time period defined by the duty cycle in response to receiving the emergency broadcast message by setting a duplication detection timer and by restarting the duplicate detection timer when the one or more additional emergency broadcast messages include at least one message that is not a duplicate of the emergency broadcast message.

2. The method of claim 1, wherein operating the radio in the emergency broadcast message mode comprises switching, at an expiry of the duplication detection timer, the radio to a radio-off state.

3. The method of claim 1 further comprising:
   receiving user input before operating the radio beyond the time period defined by the duty cycle.

4. The method of claim 1 further comprising:
   setting a guard timer after receiving the emergency broadcast message; and
   at an expiry of the guard timer, switching the radio to a radio-off state.

5. The method of claim 1, wherein operating the radio in the radio-on state based on the duty cycle comprises operating the radio in the radio-on state for a first duration and operating the radio in a radio-off state for a second duration, a ratio between the first duration and the second duration being indicative of the duty cycle.

6. The method of claim 1, wherein the emergency broadcast message is a Commercial Mobile Alert System broadcast message.

7. The method of claim 1, wherein the duty cycle is associated with the user equipment operating in a low-power mode.

8. The method of claim 7, wherein the emergency broadcast message is a location-based emergency broadcast message, the method further comprising:
   storing the location-based emergency broadcast message; and
   conveying the location-based emergency broadcast message to a user when a location-based condition is satisfied and while the user equipment is operating in the low-power mode.

9. A method of operating user equipment having a radio comprising:
   operating the radio in a radio-on state during a first time period based on a power consumption threshold;
   operating the radio in the radio-on state during a second time period based on the power consumption threshold;
   operating the radio in a radio-off state during a third time period between the first time period and the second time period; and
   in response to reaching the power consumption threshold while operating the radio in the radio-on state during the first time period, switching to operating the radio in the radio-off state during the third time period.

10. The method of claim 9, wherein operating the radio in the radio-on state during the first time period comprises performing one or more intermittent cell search operations.

11. The method of claim 10, wherein operating the radio in the radio-on state during the first time period comprises performing a data transfer operation after the one or more intermittent cell search operations.

12. The method of claim 11, wherein a duration of the data transfer operation is determined based on the power consumption threshold.

13. A method of operating user equipment having wireless circuitry comprising:
   receiving user input that informs radio operations;
   after receiving the user input, operating, based on the received user input, a radio of the wireless circuitry in a radio-on state based on a duty cycle;
   receiving, by the radio, an emergency broadcast message when the radio is operating in the radio-on state; and
   operating the radio beyond a time period defined by the duty cycle in response to receiving the emergency broadcast message.

14. The method of claim 13, wherein the radio is operated beyond the time period defined by the duty cycle based on the received user input.

15. The method of claim 13, wherein the emergency broadcast message is a location-based emergency broadcast message.

16. The method of claim 13, wherein the emergency broadcast message is a Commercial Mobile Alert System broadcast message.

17. The method of claim 13, wherein operating the radio in the radio-on state based on the duty cycle is associated with the user equipment operating in a low-power mode.

18. The method of claim 1, further comprising:
   setting a guard timer after receiving the emergency broadcast message, the guard timer having a longer duration than the duplicate detection timer; and
   at the expiry of the guard timer, switching the radio to a radio-off state.

* * * * *